US006226646B1

(12) United States Patent
Geurts

(10) Patent No.: US 6,226,646 B1
(45) **Date of Patent: *May 1, 2001**

(54) STORAGE MEDIUM CARRYING GEOGRAPHICAL LOCATION DATA

(75) Inventor: Joris H. J. Geurts, Eindhoven (NL)

(73) Assignee: Mannesmann VDO AG, Frankfurt am Main (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/792,323

(22) Filed: Jan. 31, 1997

Related U.S. Application Data

(63) Continuation of application No. 09/792,323, filed on Jan. 31, 1997.

(30) Foreign Application Priority Data

Mar. 12, 1996 (EP) .................................................. 96200672

(51) Int. Cl.[7] ...................................................... G06F 17/30
(52) U.S. Cl. ............................................ 707/100; 707/101
(58) Field of Search .................................... 707/201, 204, 707/100, 101; 455/18, 38; 701/200; 379/93.23

(56) References Cited

U.S. PATENT DOCUMENTS

| | | | | |
|---|---|---|---|---|
| 5,133,081 | * | 7/1992 | Mayo | 455/18 |
| 5,152,012 | * | 9/1992 | Schwob | 455/158.5 |
| 5,355,526 | * | 10/1994 | Berninger | 455/161.2 |
| 5,450,395 | * | 9/1995 | Hostetter et al. | 370/320 |
| 5,771,280 | * | 6/1998 | Johnson | 379/93.23 |
| 5,802,492 | * | 9/1998 | DeLorme et al. | 701/200 |

FOREIGN PATENT DOCUMENTS

| | | | |
|---|---|---|---|
| 96202115 | of 0000 | (DE) . | |
| 0738994A1 | 10/1996 | (EP) | G08G/1/0967 |
| 0754964A1 | 1/1997 | (EP) | G03C/1/005 |

OTHER PUBLICATIONS

"Location Referencing Rules for FDS–TMC", European Road Transport Telematics Implementation Coordination organization, Task Force on Geographical Location References, CORD Project V 2056, Deliverable No. D010, pp. 2–42, Aug. 1995.*

* cited by examiner

*Primary Examiner*—Wayne Amsbury
*Assistant Examiner*—Cheryl Lewis
(74) *Attorney, Agent, or Firm*—Mayer, Brown & Platt

(57) ABSTRACT

A storage medium (202) carries data structures (220–222) with attribute values (224–232) for a plurality of geographical locations. On the basis of a given code the storage medium is accessed by a system in order to read the attribute values of the data structure (222) corresponding to the given code. The storage medium in accordance with the invention stores a structure description (236) which specifies the layout of the data structure (222) in attribute values. The system consults this structure description and, as a result, knows the layout of the relevant data structure. By storing the structure description on the storage medium different data structures with an individual more suitable layout can be stored. Moreover, a subsequent version of the storage medium can store an adaptation of the data structure layout while it can still be read by the original system.

12 Claims, 4 Drawing Sheets

STORAGE MEDIUM CARRYING GEOGRAPHICAL LOCATION DATA

This is a continuation of prior application Ser. No. 09/792,323 filed Jan. 31, 1997 which claims priority from European Patent Application No. 96200672.2 filed Mar. 12, 1996.

BACKGROUND OF THE INVENTION

The invention relates to a storage medium carrying data relating to a plurality of geographical locations, which data comprise for each of the geographical locations a data structure with one or more attribute values.

The invention further relates to a system for reading data relating to a plurality of geographical locations from a storage medium, the data for each of the geographical locations comprising a location code and a data structure with one or more attribute values, which system comprises a read module for reading a given data structure associated with a given location code on the basis of correspondence of a given code to said location code.

The invention further relates to a TMC receiver for receiving traffic messages.

The invention further relates to a method of storing data relating to two or more geographical locations on a storage medium, a data structure with one or more attribute values being stored for each of the geographical locations.

The invention further relates to a system for storing data relating to two or more geographical locations on a storage medium, which system comprises a write module for storing for each of the geographical locations a data structure with one or more attribute values.

The storage and the processing of said data are known from the document "Location Referencing Rules For RDS-TMC", European Road Transport Telematics Implementation Co-ordination Organisation, Task Force on Geographical Location Referencing, CORD Project V 2056, Deliverable No D010, August 995. This document gives a number of rules concerning the specification of geographical locations for use in traffic messages. One application of such traffic messages is the presentation of traffic information to drivers of vehicles. A traffic message is then transmitted from a central station and received by a receiver in the vehicle. Such a receiver is referred to as a Traffic Message Channel (TMC) receiver. This receiver converts the traffic message into information for the driver and reproduces this information via a display screen or via a loudspeaker. The data specifying a geographical location is stored on a local storage medium in a system in the receiver. A traffic message generally includes only a reference to a geographical location and upon reception of the traffic message the system in the vehicle retrieves the data relating to the geographical location from the local storage medium. Page 22 of the reference specifies a number of location types. For each of said types it is defined which attributes, i.e. what types of data, form the specification. Some attributes are mandatory and some are optional. In addition to said attributes, it is further possible to include extra attributes in order to adapt the specification of geographical locations to a given application, see for example pages 27 and 28 of the reference. Annex A1 of the reference contains a more comprehensive list of types of geographical locations.

The known system, which utilizes information about geographical locations in the above manner, carries the data relating to a multitude of geographical locations on a local storage medium. For each geographical location space for any possible attribute of a geographical location has been reserved on the storage medium. This results in a record having a fixed layout in fields which store values of the attributes. The system knows this layout and consequently knows the location in the record where the value of a given attribute is stored, for example the name or the number of a road, and can process this information. A drawback of the known storage medium is that some of the fields reserved in the records on the storage medium remain unused because no values exist for all the possible attributes of each geographical location. A further drawback of the known storage medium is that a future extension of attributes of a geographical location makes it necessary for the system reading the storage medium to be immediately adapted to the extension. A new version of the storage medium storing records with a new field for a new attribute cannot be read by the current version of the system because the layout of the record has been changed.

OBJECTS AND SUMMARY OF THE INVENTION

It is an object of the invention to provide a storage medium of the type defined in the opening paragraph, on which the data can be stored in a more efficient and more flexible manner than on the known storage medium. To this end, the storage medium in accordance with the invention is characterized in that the data for a first one of the geographical locations comprise a first structure description, which describes a layout of the data structure associated with the first geographical location and for a second one of the geographical locations comprise a second structure description, which second structure description differs from the first structure description and describes a layout of the data structure which is associated with the second geographical location and which differs from the first data structure. For a given geographical location the values of a number of attributes are stored in the data structure on the storage medium. Which attributes these are and how large the required space for the value of each of the attributes in the data structure is, is specified in the relevant structure description. For different geographical locations with values for different attributes different structure descriptions are stored on the storage medium. If for different geographical locations values for the same attributes are present on the storage medium, the same structure description can be used for both locations. As a result of the use of the structure description, it is no longer necessary to reserve in advance space for a value of any possible attribute for a geographical location. An advantage of the storage medium in accordance with the invention is that it is adequate to store only the data structure with the currently existing values of the attributes and a structure description which specifies the data structure for the relevant geographical location. The number of structure descriptions required is substantially smaller than the number of different geographical locations for which data have been stored, because for many locations a similar combination of attributes is used. A further advantage of the storage medium in accordance with the invention is that the actual layout of the data structure of the data of a geographical location is stored with the data themselves and need not be known in advance in the system which is to read the data. For a given geographical location it is determined by means of a structure description for which attributes the storage medium stores a value and how the layout is. When a subsequent version of the storage medium with a value for a new attribute for the given geographical location is issued, the structure description on the new version of the storage medium will describe this new layout. As a result, the new version can be read and processed in the same way as the current version. For the same reason a newer version of the system, adapted to read the storage medium with the new attribute in the data structure, is readily capable of also reading the old version of the storage medium.

An embodiment of the storage medium in accordance with the invention is characterized in that the data for each of the geographical locations comprise a location index record, which record comprises a first reference to the structure description corresponding to the relevant geographical location and a second reference to the data structure associated with the relevant geographical location. Owing to the location index records the data of the relevant geographical location can be located more easily. The location index records are short, thus enabling the location index record corresponding to the desired geographical location to be found in a simple and rapid manner. Subsequently, on the basis of the first reference, the structure description is read and, on the basis of the second reference, using the structure description thus read, the actual data of the geographical location are read directly without any further searching.

The system for reading data relating to a geographical location in accordance with the invention is characterized in that the read module has been adapted to read, prior to reading of the given data structure, a structure description which corresponds to the given location code and which describes a layout of the given data structure. The read module of the system does not a priori know the layout of the data structure with the attribute values but reads this layout from the storage medium. This makes the system suitable for reading data structures having different layouts. This permits different types of data structures adapted to the actually available data to be stored on the same storage medium. Then, no vacant space for attribute values which are not present has to be reserved on the storage medium. Moreover, the system in accordance with the invention allows a subsequent version of the storage medium to have another data layout, for example in that a new attribute is added. The flexibility of the system in accordance with the invention is obtained in that the information about the structure of the attributes of the geographical location is partly stored on the storage medium.

The TMC receiver in accordance with the invention is characterized in that the TMC receiver includes a receiving section for receiving a code, and the TMC receiver includes a system in accordance with the invention as defined above, for reading the data associated with the received code from a storage medium.

The method in accordance with the invention, for storing data relating to two or more geographical locations, is characterized in that for a first one of the geographical locations a first structure description is stored, which first structure description describes a layout of the data structure associated with the first geographical location, and for a second one of the geographical locations a second structure description is stored, which second structure description differs from the first structure description and describes a layout of the data structure which is associated with the second geographical location and which differs from the first data structure.

The system in accordance with the invention, for storing data relating to two or more geographical locations, is characterized in that the write module has been adapted to store a first structure description for a first one of the geographical locations, which first structure description describes a layout of the data structure associated with the first geographical location, and to store a second structure description for a second one of the geographical locations, which second structure description differs from the first structure description and describes a layout of the data structure which is associated with the second geographical location and which differs from the first data structure.

Further attractive variants of the method, of the system and of the storage medium in accordance with the invention, have been defined in subsidiary claims.

The invention can be used in an apparatus as described in U.S. patent application U.S. Ser. No. 08/631383, allowed in the name of Applicant of the present Application and corresponding to the European Patent Application published under number EP 0 738 994 A1 (PHF 95522).

The invention can also be used in an apparatus as described in U.S. patent application U.S. Ser. No. 08/652397, U.S. Pat. No. 5,835,854 in the name of Applicant of the present Application and corresponding to the European Patent Application published under number EP 0 754 964 A1 (PHF 95530).

The invention can also be used in a radio receiver as described in U.S. patent application U.S. Ser. No. 08/678848, U.S. Pat. No. 5,860,462 in the name of Applicant of the present Application and corresponding to the European Patent Application filed under number EP 96202115.0 PHD 95075).

BRIEF DESCRIPTION OF THE DRAWINGS

The invention will now be described in more detail, by way of example, with reference to the drawings, in which.

In the drawings like reference numerals refer to similar or corresponding parts.

DETAILED DESCRIPTION OF THE PREFERRED EMBODIMENT

Figure 1:
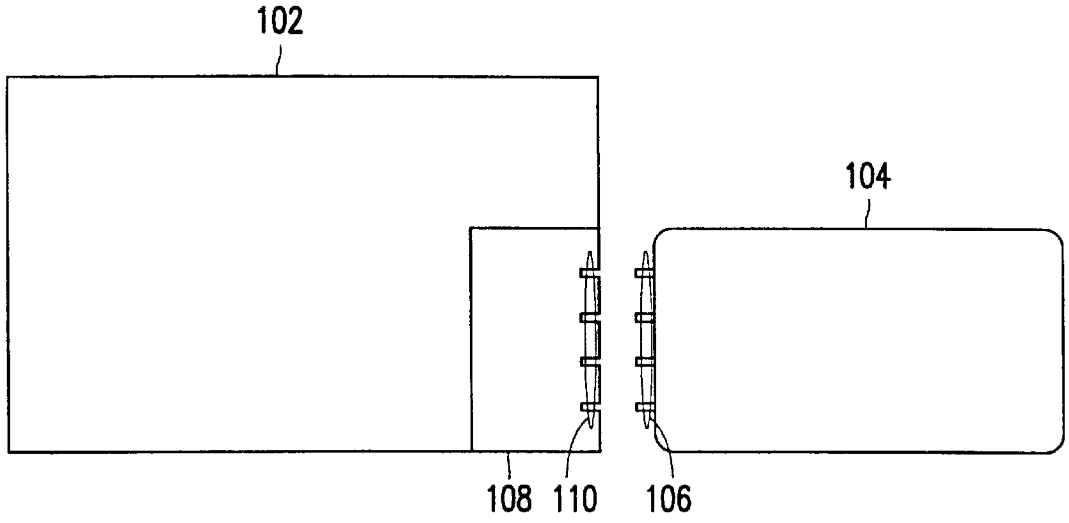
FIG. 1 represents diagrammatically a field of use of an embodiment of the storage medium in accordance with the invention.

FIG. 1 shows diagrammatically a field of use of an embodiment of the storage medium in accordance with the invention. It concerns a Traffic Message Channel (TMC) decoder 102, which receives a given code of a geographical location and which reads associated data from the local storage medium 104. The local storage medium 104 is a card having electrical contacts 106, enabling the card to be read out in a card reader 108 of the TMC decoder. To this end, the card reader has a plurality of corresponding contacts 110. With reference to FIG. 1 the storage medium is described as a card, but the invention can likewise be applied to other storage media such as, for example, a Compact Disc or a magnetic disc. In the case of another storage medium the card reader of the TMC decoder will obviously be replaced by a reader adapted to read the other storage medium. A large number of countries have made agreements on rules for coding and storing the data of relevant geographical locations. For this, reference is made to, for example, the document "Location Referencing Rules For RDS-TMC", European Road Transport Telematics Implementation Co-ordination Organisation, Task Force on Geographical Location Referencing, CORD Project V 2056, Deliverable No D010, August 1995. The geographical locations have been arranged in a plurality of groups and the data have been stored per group in a data base named regional data base. The storage medium in accordance with the invention carries one or more of such regional data bases, for example the data of the geographical locations of a certain country.

Figure 2:
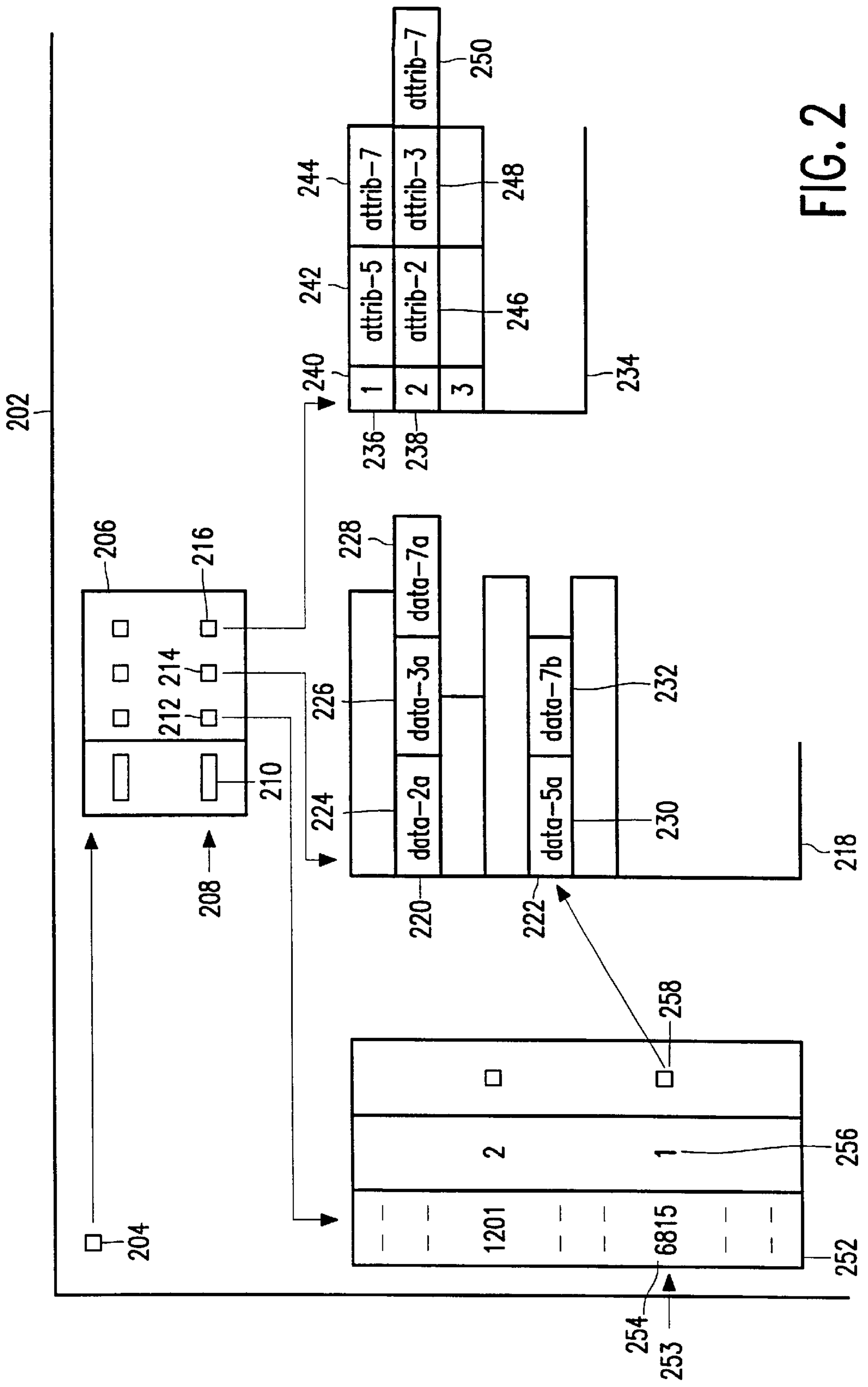
FIG. 2 shows a number of elements of the layout of the data on the storage medium.

FIG. 2 shows a number of elements of the layout of the data on the storage medium. The storage medium 202 contains a block of identification and control data at a given fixed address. This block includes a reference 204 to an index list 206 of the storage medium. This index list specifies which regional data bases have been stored on the relevant storage medium. This may be just one data base. For this purpose the index list has rows, such as a row 208, with a field 210 containing the data base identification and with fields 212, 214 and 216, each containing a reference to a respective file with data of the relevant data base. The file 218 contains the actual data about the geographical locations in the form of data structures, for example 220 and 222, which each include a plurality of attribute values; in the examples these are 224–228 and 230–232, respectively. The data structures are records of variable lengths since different geographical locations can have a value in the data base for different attributes. The file 218 contains a data structure for each relevant geographical location in the relevant region of the data base and, as a result, it is sizeable relative to the further files in the regional data base.

A file 234 in FIG. 2 contains structure descriptions, for example 236 and 238, of the layouts of the data structures with attribute values appearing in the file 218. The structure descriptions are variable-length records comprising a first field 240 to identify the structure description and comprising further fields, in the present example the fields 242–244 and 246–250, respectively, indicating the presence and the meaning of an attribute value in the relevant data structure. These fields also specify the length which the attribute value has in the data structure. For example, the data structure 222 has a layout described by the structure description 236. The structure description 236 indicates that the data structure 222 has a first field containing a value for an attribute 5, i.e. the field 230, and a second field containing a value for an attribute 7, i.e. the field 232. Data structures of different geographical locations having a value in the file 218 for the same attributes have mutually identical record layouts when these attributes are in the same sequence. In that case they are described by means of the same structure description. As a result, the number of structure descriptions in the file 234 is smaller than the number of structure descriptions in the file 218. In a certain practical case approximately 70 structure descriptions appeared to be adequate for a file comprising approximately 3800 data structures. A larger example than the one given in FIG. 2 is discussed in the Appendix.

A file 252 in FIG. 2 is an index file with a location index record for each geographical location for which the data base contains data. A location index record, such as a record 253, comprises a field, such as a field 254, with a location code relating to the identification of the relevant geographical location. The location index record further comprises a field, such as a field 256, with a reference to the structure description in accordance with which the data structure of the relevant geographical location has been organized. Finally, the location index record comprises a field, such as a field 258, with a reference to the data structure of this geographical location. In the embodiment of the storage medium in accordance with the invention shown in FIG. 2 the location index record refers to the data structure in that the address of the data structure is inserted in the field 258. In view of the size of the storage medium an address has been given a length of 3 bytes and the field in the in the location index record should therefore also have a length of 3 bytes. The location index record refers to the structure description by means of an identifying code of the structure description. Each structure description has an individual code and the location index record includes the code of the relevant structure description in the field 256. Since there are not many structure descriptions not many different codes are required and a field having a length of 1 byte is adequate for the storage of the code in the location index record. This requires less space than in the case that reference would have been made by means of an address.

Figure 3:
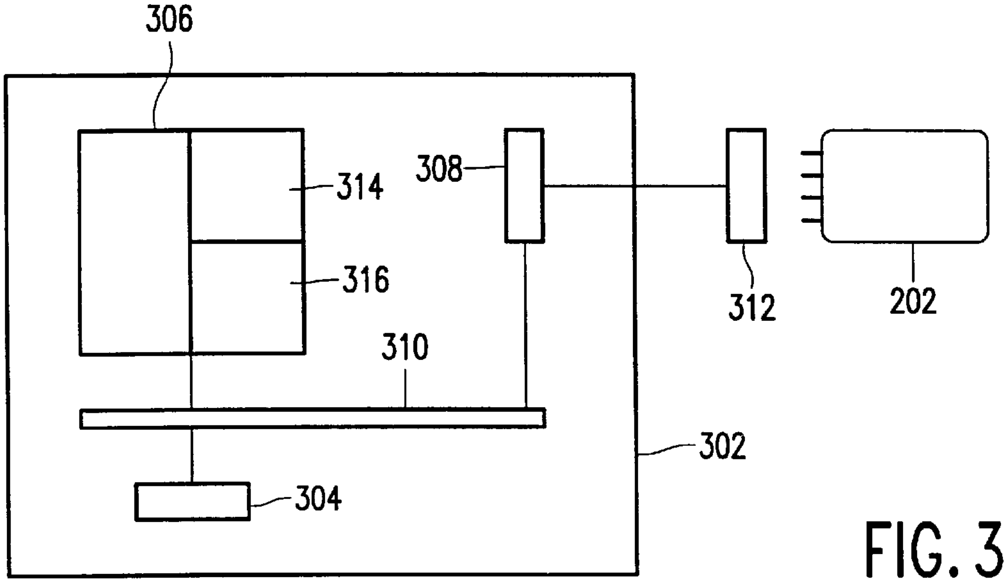
FIG. 3 shows a number of elements of the system for reading data in accordance with the invention.

FIG. 3 shows a number of elements of the system for reading data in accordance with the invention. The system 302 comprises a processor 304 for carrying out a program, which for this purpose has been loaded into a working memory 306. The system further comprises an interface section 308 for the exchange of data and control information between the various parts. The system 302 is adapted to receive data from a read unit 312 or reading out the storage medium 202. In a particular embodiment of the system the storage medium is a chip card, as is shown in FIG. 1, but another type of storage medium is also possible. The system further comprises a read module 314 and a search module 316, which are loaded into the working memory from a permanent memory in the system or from a background memory such as a magnetic or optical disc. The system 302 serves to read the geographical data associated with a given code in the received traffic message from the storage medium 202. The traffic message includes an identification of the regional data base to which the message pertains. After an initialization step it is ascertained whether this data base occurs on the storage medium via the reference 204 by means of the index list 206. If this is the case, the three reference fields 212–214 are read, so that the locations of the files of this data base on the storage medium are known. Subsequently, the search module 316 searches the file 252 for a location index record whose location code, stored in the first field of the record, matches the given code. In an embodiment of the system in accordance with the invention the customary binary search technique is used for this purpose, the file being searched in steps which are halved each time. After the relevant location index record has been found, the read module 314 reads that structure description of the file 234, for which the identification code in the first field matches the code in the second field of the relevant location index record. From this structure description the read module learns which attribute values have been stored for the relevant geographical location in the data structure, in which sequence and with which length. Subsequently, the read module reads the attribute values of the data structure from the file 218 via the reference in the third field of the location index record. This reference provides the address of the first attribute value. The following attribute values can be found owing to the structure description.

When the storage medium shown in FIG. 2 is accessed by the system shown in FIG. 3 to read the data of the geographical location 6815, the following steps can be distinguished. From the traffic message it follows that the relevant regional data base occurs in the index list 206 as row 208. Subsequently, the search module searches the file 252, via the reference 212, for the desired location index record 253. This location index record 253 provides two references. These are a reference to the structure description 236, because the code in the field 256 is the same as the code in the field 240, and a reference to the start of the data structure 222, the field 258 containing the start address. The read module reads the successive attribute values 230 and 232, because it follows from the fields 242 and 244 of the structure description 236 that these belong to the data structure of the relevant geographical location.

The invention can be applied inter alia in a mobile apparatus in a motor car. The system in accordance with the invention in such an apparatus has a small computing capacity and a small working memory as compared with general-purpose computers. Therefore, it is advantageous that the storage medium has to be accessed only a few times in order to read the data from the storage medium in accordance with the invention. The file with the structure descriptions contains only a few records and, in practice, it can be loaded into the working memory in one initialization step and remain there in order to be consulted by the read module. Furthermore, the start addresses of the three files will be read in the initialization step. Each time that after this data of a given geographical location are to be retrieved, this requires only a few accesses to the storage medium to search the location index file and one access for the data structure found.

Figure 4:
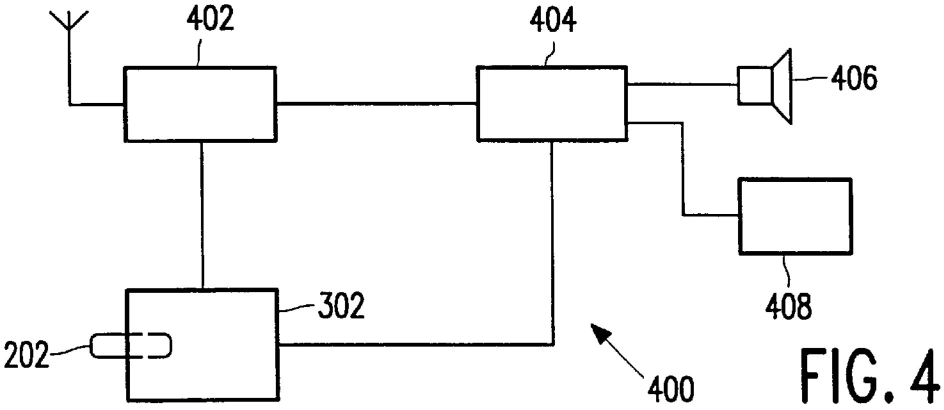
FIG. 4 shows some parts of a TMC receiver.

FIG. 4 shows some parts of a TMC receiver. A TMC receiver is realized as a car radio having the additional capability of receiving and reproducing traffic messages. The TMC receiver has a receiving section 402, which inter alia receives a code of a given geographical location. The TMC receiver further has a system 302 as described with reference to FIG. 3, for reading data from the local storage medium 202 on the basis of the received code. In addition, there is a part 404 capable of reproducing the traffic messages and data thus read via a loudspeaker 406 and/or a display screen 408. Further details about the TMC receiver are not relevant within the scope of the present invention and can be found, if desired, in the afore-mentioned Patent Application EP 0 745 964.

Figure 5:
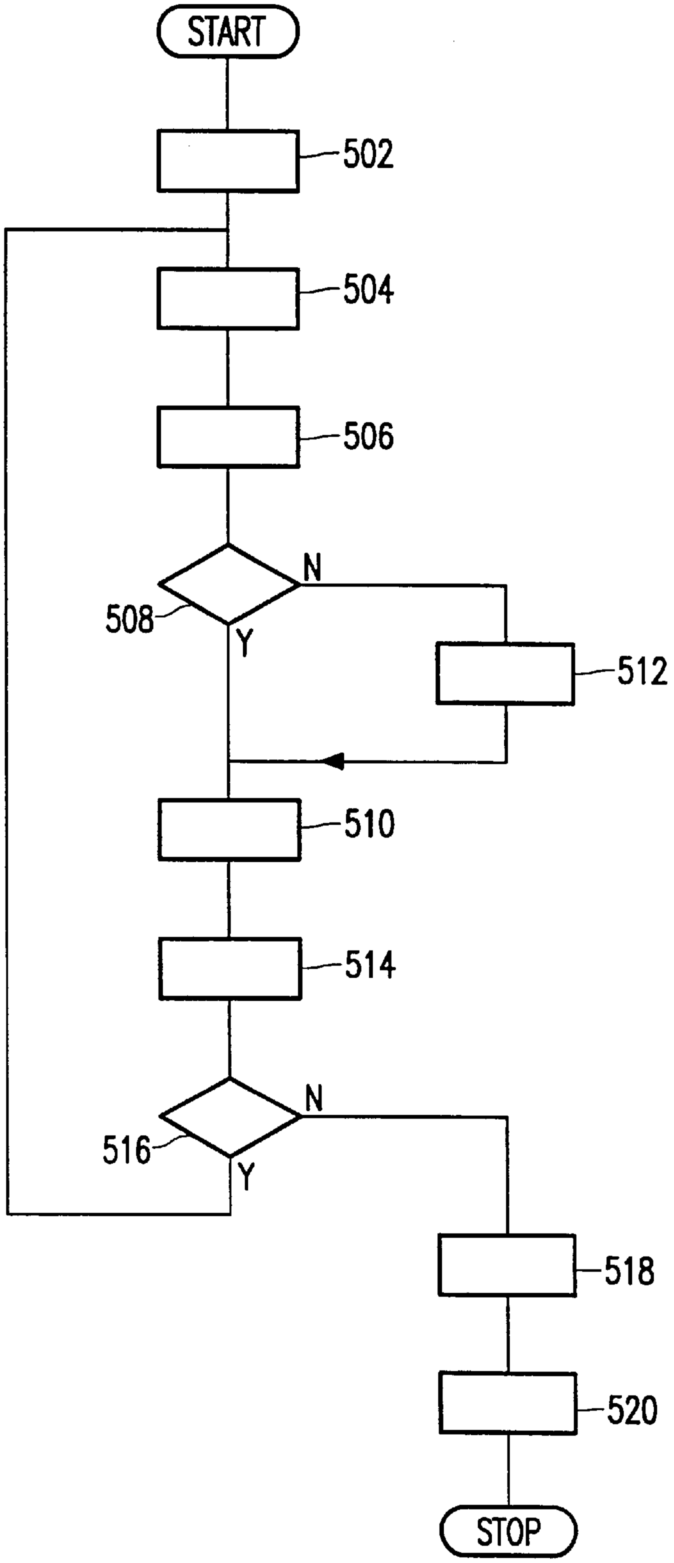
FIG. 5 is a flow chart of the method of storing data of geographical locations in accordance with the invention.

FIG. 5 is a flow chart of the method of storing data of geographical locations in accordance with the invention. This involves the read-out and selection of geographical location data in a source file and the conversion to the format of the storage medium in accordance with the invention, as described with reference to FIG. 2. The present flow chart represents a particular variant of the method but alternative variants are also possible. Block 502 is an initialization step in which the necessary files are opened and the necessary space is reserved. In block 504 the first or a following record of the source file is read. After this, it is ascertained in block 506 which attribute values are present in the record. Subsequently, it is determined in 508 whether a structure description containing these attribute values has already been made for a previous record. If this is the case, a data structure is made and stored in the file in 510. If this is not the case, a new suitable structure description is generated and stored in the structure description file in block 512 prior to 510. After the generation and storage of the data structure a location index record is generated in block 514, which record has the location code of the relevant geographical location in its first field, the code of the relevant structure description in its second field, and a reference to the location where the relevant data structure has just been stored on the storage medium in its third field. Finally, it is verified in 516 whether a subsequent record of the source file is to be read. If yes, the program returns to block 504, where a following record is read and processed as described above. If no further record is to be read, the location index records made in block 518 are arranged in the sequence of the location code in the first field and stored in a location index file on the storage medium. Moreover, the index list of the storage medium is updated and the open files are closed in block 520.

Figure 6:
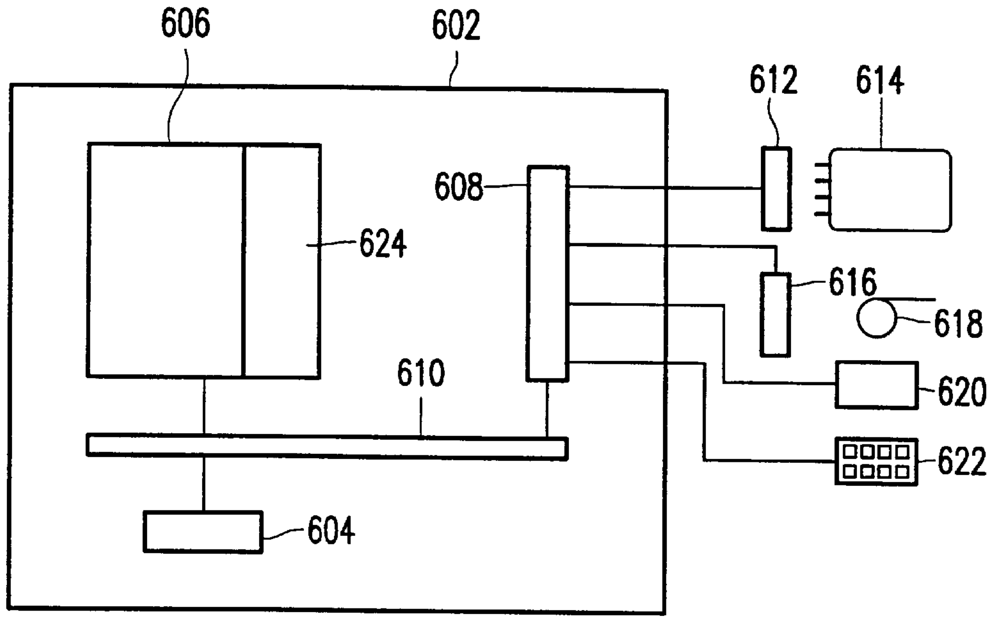
FIG. 6 shows a number of elements of the system for storing data in accordance with the invention.

FIG. 6 shows a number of elements of the system for storing data in accordance with the invention. The system 602 comprises a processor 604 for carrying out a program which for this purpose has been loaded into a working memory 606. The system further comprises an interface section 608 for the exchange of data with the various peripherals. There is a bus 610 for the exchange of data and control information between the various elements. The system 602 can be based on a general-purpose computer loaded with suitable programs. The system can supply data to a card write unit 612 for writing onto a card 614 which serves as a storage medium. However, it also possible to choose another medium, for example an optical or magnetic disc, for this purpose. Moreover, the system can read data from a unit 616 via which the geographical location data are received from a source file 618 on, for example, a tape. Besides, the source file may also be presented to the system on another carrier, for example a magnetic disc or an optical disc, or via connection to a network. Furthermore, a display screen 620 and a keyboard 622 can be connected to the system for control purposes. A part of the program loaded into the working memory 606 of the system is a write module 624. This write module can write onto the storage medium as described with reference to FIG. 2 in accordance with the method illustrated in FIG. 5. The program is loaded into the memory from a permanent memory in a manner which is customary for the computer.

The invention offers a high flexibility as regards the storage of the geographical location data on the storage medium and as regards the system which processes the data. Owing to this flexibility there is a less rigid relationship between the actual format of the data structure on the storage medium and the format of the data structure in the processing system. The flexibility is achieved in that the information about the structure of the attributes of the geographical locations has partly been stored on the storage medium. The invention demands comparatively simple adaptations to the system and the storage medium and is therefore suitable for simple typically consumer-oriented mass-produced equipment. The invention is not only applicable to geographical location data but can also be utilized in situations where there is a need for such a flexible, less rigid coupling between a storage medium and a processing system. Examples of this are cards with medical data of patients, membership cards storing miscellaneous data of a member of a club, and membership cards of libraries for recording the lending data.

Figure 7:
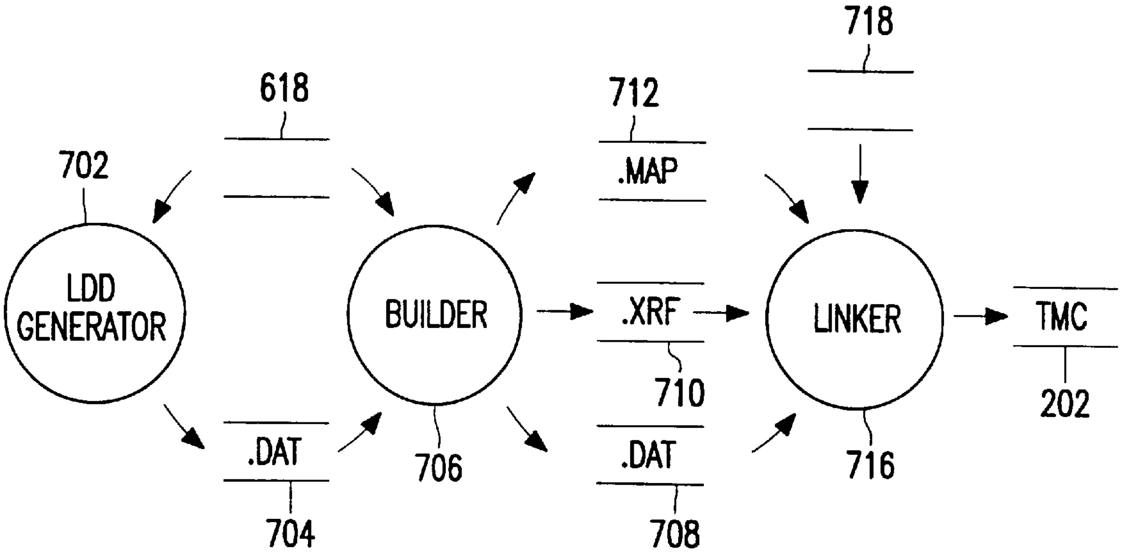
FIG. 7 is the data flow diagram of an alternative method of storing data of geographical locations in accordance with the invention.

FIG. 7 is the data flow diagram of an alternative method of storing data of geographical locations in accordance with the invention. This alternative method is particularly suitable in a situation in which different regional data bases are stored on the same storage medium. During the storage it is then not readily possible to assign in advance a location on the storage medium to the files to be formed. The method can also be used when one regional data base is stored on the storage medium. The entire source file 618 with the geographical location data is scanned in a process 702. The process 702 detects what different types of data structures occur in the source file and generates a temporary file 704 with the associated structure descriptions. In an optimization step the process 702 can reduce the number of structure descriptions by removing those structure descriptions which closely resemble other ones. It is then accepted that in the definitive file with the data structures space is reserved for a number of attribute values which are not actually used. A process 706 again reads the source file 618 and forms temporary files 708 for the data structures to be stored on the storage medium, for example for the location index file 252 with the location index records. In a temporary file 708 space has been reserved for references to other elements which may be present in other data structures. The reference has not yet been given a value because it is not yet known at which address on the storage medium the element referred to will be stored. A cross-reference record for the relevant reference is therefore also stored in a temporary file 710, which record specifies the location and the type of the reference and the element to which reference is made. The process 706 also updates an index list of the relevant data structure in a temporary file 712. This record includes an identification of the data structure, the absolute location on the storage medium (to be inserted later), and for each element an identification and the relative position in the data structure. In general, the process 706 generates a temporary data-structure file 708, a temporary cross-reference file 710, and a temporary map file 712 for each data structure to be stored on the storage medium, for example the data structure file 218 or the location index file 252 of a given regional data base. In the temporary files the elements of the data structure have been built up and have been given a mutual position in the data structure. The addresses of the references have not yet been inserted and still have only a relative value in the cross-reference records.

The process 716 handles the temporary files 708–712 and arranges the data structures in files in the desired sequence for the definitive storage medium 202. The sequence information is specified in a special file 718, which further contains the names of the temporary files for the data structures. On the basis of this sequence and the size of a data structure the process 716 calculates the addresses at which the elements of the data structure are to be stored, converts the relative addresses from the cross-reference records into absolute addresses, and inserts these into the relevant records of the data structure.

APPENDIX

The following is a more extensive example of the various files which play a part in the invention. There is a source file, given in Table I, whose data are to be converted and stored on a storage medium in accordance with the invention. The Tables II, III and IV contain the files as will occur on the storage medium, starting from the data of Table I. Table I includes a small source file with records as supplied by authorities engaged in the collection and dissemination of geographical location data. The records contain values for different attributes for the geographical locations. First of all, the identification of the location is given, followed by an E classification and E number of the road, then a second classification of the road and a number and name, then a type and sub-type designation of the geographical location, then a first name and a second name of the location, then an indication of the previous and of the next geographical location relative to the current geographical location, then an indication of the exit, then two indications of the area in which the geographical location is situated, then an indication of the segment in which the geographical location is situated, and finally two geometrical coordinates to specify the position of the geographical location. In practice, the Table comprises more records as well as more attributes than the present example. Owing to the nature of a given geographical location not all the said attributes are relevant for this geographical location. The non-relevant attributes have no values in the Table and therefore they should not be stored on the storage medium.

Moreover, for some geographical locations no values are available for all possible relevant attributes. Also in this case no value is to be stored on the storage medium.

Inspection of the records in Table I reveals that geographical locations 266, 267, 341, 455 and 912 have a similar pattern of attribute values and for these geographical locations a first structure description is defined in Table II. For the location 7017 a second structure description is made, for the location 7019 a third structure description is made and for the location 10213 a fourth structure description is made. The first field of each records in Table II gives the identification code of the relevant structure description. This provides a mechanism enabling reference to be made to the relevant structure description from another file. The second field gives the number of attributes in the structure description, so that the length of the remainder of the record is known. The other fields give the relevant attribute and the length of the value of the attribute as appearing in the data structure of the geographical location. For example, the first record of Table II gives a structure description with an identification code which is 1 and a number of attributes equal to 3. These include an attribute for the name of the geographical location, for the first are in which the geographical location is situated, and for the geometrical rectangle in which the geographical location is situated. This structure description consequently applies to the geographical locations 266, 267, 341 and 455. The type designation is always stored on the medium and is therefore not included in the structure description. As a matter of fact, in the example given in this Appendix the type designation is stored in the location index file.

Table III contains the data structures with the values as given for the geographical locations in Table I. The first column in Table III gives the start position of the data structure. This is specified as an offset relative to the start of the file with the data structures. Moreover, Table III gives the data as appearing in the relevant data structure. The first row in the table indicates that this first TMC decoder starts at offset position 000, that the first value of the string is 'Berlin' which is preceded by its length, that the second value is 1, and that the third attribute relates to the value of a rectangle in the form of the numbers 124, 127, 130 and 132. The value of some of the attributes of the geographical locations has a length which is not known in advance. These include the attribute for the name of a geographical location. In the system in which the invention is employed this has been solved by also storing the actual length of the value of such an attribute immediately before the value itself. The system which then reads, for example, the name of a geographical location then first of all finds a number representative of the length of the name at the position determined via the structure description of the relevant location. Subsequently, the system can read the given number of characters and can then, if desired, read the next attribute value. Reading an attribute value following such a variable-length attribute value means implies that the variable-length attribute value should always be read, even if this is not of interest to he system. In practice it is therefore advantageous to arrange the variable-length attribute values at the back in the data structure, so as to enable another attribute value to be read directly. However, the principle of the invention is applicable in both cases. The @-sign, which is used for example in the sixth row, indicates a position in this file. The attribute value @4101 is a reference to the data structure situated at offset position 4101 in this file.

Table IV gives the location index records of the location index file. A location index file is utilized to gain rapid access to a desired data structure on the basis of the location code of the relevant geographical location. A location index record has a fixed length and contains in its first field a location code which corresponds to the associated data structure. The second field specifies the type of the relevant geographical location and the third field specifies in accordance with which structure description the associated data structure has been stored. Finally, the fourth field specifies the start position of the desired data structure. The location code in the first field is identical to the location code of the geographical location for which the data structure, to which reference is made via the fourth field, has been stored. Each data structure has an associated location index record and each location index record has an associated data structure. The sixth row in Table IV, for example, states that the geographical location having the location code 7017 is of the 'road-segment' type and that the associated data structure has a pattern of attribute values in accordance with the structure description bearing the code 2. By means of this code this structure description can be found the file in accordance with Table II. Finally, the end of the record at the sixth row indicates that the data structure of the relevant geographical location starts at offset position 073 in the file in accordance with Table III.

TABLE I

| Loc Code | E-Class | ERoad No | Road-Class | RNo | Road-Name | Type | Sub-Type | Ni | Name2 | OffFwd |
|---|---|---|---|---|---|---|---|---|---|---|
| 266 | | | | | | BL | | Berlin | | |
| 267 | | | | | | BL | | Brandenburg | | |
| 341 | | | | | | LK | | Berlin | | |
| 455 | | | | | | LK | | Havelland | | |
| 912 | | | | | | S | | Berlin | | |
| 7017 | | | A | 10 | | SEGMENT | LINE | Werder | Havelland | |
| 7029 | | | A | 12 | | SEGMENT | LINE | Berliner Ring | Frankfurt/ Oder | |
| 10213 | E | 55 | A | 10 | Westlicher Berliner Ring | POINT | AS | Arschlußstelle Berlin-Spandux | | 10214 |

| Loc Code | OffBwd | AS | A1 | A2 | Ref-L. | Lo1 | La1 | Lo2 | La2 |
|---|---|---|---|---|---|---|---|---|---|
| 266 | | | 1 | | | 124 | 127 | 130 | 132 |
| 267 | | | 1 | | | 106 | 104 | 148 | 147 |
| 341 | | | 266 | | | 124 | 127 | 131 | 132 |
| 455 | | | 267 | | | 110 | 126 | 121 | 135 |
| 912 | | | 341 | | | 124 | 127 | 131 | 132 |
| 7017 | 7016 | | 267 | 267 | | 119 | 127 | 121 | 133 |
| 7029 | | | 267 | 267 | | 132 | 125 | 144 | 125 |
| 10213 | 10212 | 3 | 455 | | 7017 | 121 | 130 | | |

TABLE II

| ldd id | ldd nr-attrib | LDD_ATTRIBS |
|---|---|---|
| 1 | 3 | 2 bytes containing: {ATTRIB_NAME, LD_LEN_TOPONYM}, |
| | | 2 bytes containing: {ATTRIB_IN_AREA1, LD_LEN_WORD}, |
| | | 2 bytes containing: {ATTRIB_GEO_RECT, LD_LEN_LONG} |
| 2 | 8 | 2 bytes containing: {ATTRIB_ROAD_NR, LD_LEN_PTR}, |
| | | 2 bytes containing: {ATTRIB_SUB_TYPE, LD_LEN_BYTE}, |
| | | 2 bytes containing: {ATTRIB_1ST_CITY, LD_LEN_TOPONYM}, |
| | | 2 bytes containing: {ATTRIB_2ND_CITY, LD_LEN_TOPONYM}, |
| | | 2 bytes containing: {ATTRIB_IPREV_LOC, LD_LEN_WORD}, |
| | | 2 bytes containing: {ATTRIB_IN_AREA1, LD_LEN_WORD}, |
| | | 2 bytes containing: {ATTRIB_IN_AREA2, LD_LEN_WORD}, |
| | | 2 bytes containing: {ATTRIB_GEO_RECT, LD_LEN_LONG} |
| 3 | 7 | 2 bytes containing: {ATTRIB_ROAD_NR, LD_LEN_PTR}, |
| | | 2 bytes containing: {ATTRIB_SUB_TYPE, LD_LEN_BYTE}, |
| | | 2 bytes containing: {ATTRIB_1ST_CITY, LD_LEN_TOPONYM}, |
| | | 2 bytes containing: {ATTRIB_2ND_CITY, LD_LEN_TOPONYM}, |
| | | 2 bytes containing: {ATTRIB_IN_ARBA1, LD_LEN_WORD}, |
| | | 2 bytes containing: {ATTRIB_IN_AREA2, LD_LEN_WORD}, |
| | | 2 bytes containing: {ATTRIB_6E0_RECT, LD_LEN_LON6} |
| 4 | 11 | 2 bytes containing: {ATTRIB_EROAD_NR LD_LEN_PTR}, |
| | | 2 bytes containing: {ATTRIB_NROAD_NR LD_LEN_PTR}, |
| | | 2 bytes containing: {ATTRIB_ROAD_NAME, LD_LEN_TOPONYM}, |

TABLE II-continued

| ldd id | ldd nr-attrib | LDD_ATTRIBS |
|---|---|---|
| | | 2 bytes containing: {ATTRIB_SUB_TYPE, LD_LEN_BYTE}, |
| | | 2 bytes containing: {ATTRIB_NAME, LD_LEN_TOPONYM}, |
| | | 2 bytes containing: {ATTRIB_PREV_LOC, LD_LEN_WQRD}, |
| | | 2 bytes containing: {ATTRIB_NEXT_LOC, LD_LEN_WORD}, |
| | | 2 bytes containing: {ATTRIB_EXIT_NO, LD_LEN_WORD}, |
| | | 2 bytes containing: {ATTRIB_IN_AREA1, LD_LEN_WORD}, |
| | | 2 bytes containing: {ATTRIB_ALONG_SEG, LD_LEN_WORD}, |
| | | 2 bytes containing: {ATTRIB_GE0_COQRD, LD_LEN_WORD} |

TABLE III

| offset | loc_data |
|---|---|
| 000 | 13 bytes containing: {(6,'Berlin'), 1, (124, 127, 130, 132)} |
| 013 | l8 bytes containing: {(11, 'Brandenburg'), 1, (106, 104, 148, 147)} |
| 031 | 13 bytes containing: {(6, 'Berlin'), 266, (124, 127, 131, 132)} |
| 044 | 16 bytes containing {(9, 'Havelland'), 267, (11O, 126, 121, 135)} |
| 060 | 13 bytes containing {(6, 'Berlin'), 341, (124, 127, 121, 132)} |
| 073 | 31 bytes: {@4101, ST_LINE, (6, 'Werder'), (9, 'Havelland'), 7016, 267, 267, (119, 127, 121, 133)} |
| 104 | 41 bytes: {@4106, ST_Line, (13, 'Berliner Ring'), (14, 'Frankfurt/Oder'), 267, 267, (132, 125, 144, 125)} |
| 145 | 74 bytes: {@4026, @4101, (24, 'Westlicher Berliner Ring'), ST_AS, (29, 'Anschlußstelle Berlin-Spandau'), 10214, 10212, 3, 455, 7017, (121, 130) |

TABLE IV

| loc_code | loc_type | ldd_id | loc_offset |
|---|---|---|---|
| 266 | LT-BL | 1 | 3-byte pointer containing offset: 000 |
| 266 | LT_BL | 1 | 3-byte pointer containing offset: 013 |
| 341 | LT_BK | 1 | 3-byte pointer containing offset: 031 |
| 355 | LT_LK | 1 | 3-byte pointer containing offset: 044 |
| 912 | LT_S | 1 | 3-byte pointer containing offset: 060 |
| 7017 | LT_SEG | 2 | 3-byte pointer containing offset: 073 |
| 7029 | LT_SEG | 3 | 3-byte pointer containing offset: 104 |
| 10213 | LT_POINT | 4 | 3-byte pointer containing offset: 145 |

I claim:

1. A system for reading data relating to a plurality of geographical locations from a storage medium, which data comprise for each of the geographical locations a location code and a data structure having a predetermined layout organizing one or more attribute values, which system comprises a read module for reading a given data structure associated with a given location code on the basis of correspondence of a given code to said location code using a structure description, characterized in that the read module has been adapted to read, prior to reading of the given data structure, the structure description which corresponds to the given location code and which describes the layout of the given data structure and wherein said read module uses the structure description to locate and read said one or more attribute values in the data structure.

2. A system as claimed in claim 1, characterized in that the system comprises a search module for locating a location index record on the storage medium on the basis of the given code, and the read module has been adapted to read the structure description on the basis of a first reference in the location index record and for reading the given data structure on the basis of a second reference in the location index record.

3. A TMC receiver for receiving traffic messages, characterized in that the TMC receiver includes a receiving section for receiving a code, and the TMC receiver includes a system as claimed in claim 1, for reading the data associated with the received code from a storage medium.

4. A method of storing data relating to two or more geographical locations on a storage medium, a data structure having a predetermined layout organizing one or more attribute values being stored for each of the geographical locations, characterized in that for a first one of the geographical locations a first structure description is stored, which first structure description describes the layout of the data structure associated with the first geographical location and is read to determine the locations in the data structure associated with the first geogaphical location to store one or more attribute values, and for a second one of the geographical locations a second structure description is stored, which second structure description differs from the first structure description and describes a layout of the data structure which is associated with the second geographical location and which differs from the first data structure.

5. A method as claimed in claim 4, characterized in that for each of the geographical locations a location index record is stored on the storage medium, which location index record comprises a first reference to the relevant structure description and a second reference to the relevant data structure with the attribute values.

6. A system for storing data relating to two or more geographical locations on a storage medium, which system comprises a write module for storing for each of the geographical locations a data structure having a predetermined layout organizing one or more attribute values, characterized in that the write module has been adapted to store a first structure description for a first one of the geographical locations, which first structure description describes the layout of the data structure associated with the first geographical location, and to store a second structure description for a second one of the geographical locations, which second structure description differs from the first structure description and describes a layout of the data structure which is associated with the second geographical location and which differs from the first data structure, wherein the write module reads the first structure description to determine the layout of the data structure associated with the first georaphical location to store one or more attribute values in the data structure.

7. A system as claimed in claim 6, characterized in that the write module has been adapted to store for each of the geographical locations comprise a location index record, which location index record comprises a first reference to the structure description corresponding to the relevant geographical location and a second reference to the data structure of the relevant geographical location.

8. A storage medium carrying data relating to a plurality of geographical locations, which data comprise for each of the geographical locations a data structure having a predetermined layout organizing one or more attribute values, characterized in that the data for a first one of the geographical locations comprise a first structure description, which describes the layout of the data structure associated with the first geographical location and is read to determine the locations in the data structure associated with the first geographical location to store the one or more attribute values and for a second one of the geographical locations comprise a second structure description, which second structure description differs from the first structure description and describes a layout of the data structure which is associated with the second geographical location and which differs from the first data structure.

9. A storage medium as claimed in claim 8, characterized in that the data for each of the geographical locations comprise a location index record, which record comprises a first reference to the structure description corresponding to the relevant geographical location and a second reference to the data structure associated with the relevant geographical location.

10. A storage medium as claimed in claim 9, the data for each of the locations comprising a location code for the identification of the data structure associated with the relevant location, characterized in that the location code has been included in the index record containing the reference to the data structure associated with the relevant location.

11. A storage medium carrying data relating to a plurality of geographical locations, which data comprise for each of the geogaphical locations a data structure with one or more attribute values, characterized in that the data for a first one of the geographical locations comprise a first structure description, which describes a layout of the data structure associated with the first gographical location and for a second one of the geographical locations comprise a second structure description, which second structure description differs from the first structure description and describes a layout of the data structure which is associated with the second geographical location and which differs from the first data structure characterized in that the storage medium comprises a chip card having a memory with the stored data.

12. A storage medium as claimed in claim 11, the storage medium comprising a TMC card with traffic-message data.

* * * * *